Oct. 16, 1934.  T. W. SMALL  1,977,456
AUTOMATIC GRAPHOPHONE
Filed July 29, 1927   7 Sheets-Sheet 1

Inventor,
Thomas W. Small
by Hull, Brock & West
Attorneys

Oct. 16, 1934.            T. W. SMALL                 1,977,456
                     AUTOMATIC GRAPHOPHONE
                      Filed July 29, 1927        7 Sheets-Sheet 3

Oct. 16, 1934.  T. W. SMALL  1,977,456
AUTOMATIC GRAPHOPHONE
Filed July 29, 1927  7 Sheets-Sheet 5

Inventor
Thomas W. Small
By Hull, Brock & West
Attorneys

Oct. 16, 1934.    T. W. SMALL    1,977,456
AUTOMATIC GRAPHOPHONE
Filed July 29, 1927    7 Sheets-Sheet 7

Inventor
Thomas W. Small
By Hull, Brock & West
Attorneys

Patented Oct. 16, 1934

1,977,456

UNITED STATES PATENT OFFICE 1,977,456

AUTOMATIC GRAPHOPHONE

Thomas W. Small, Cleveland, Ohio, assignor, by mesne assignments, to The Capehart Corporation, Fort Wayne, Ind., a corporation of Indiana Application July 29, 1927, Serial No. 209,241

46 Claims. (Cl. 274—10)

This invention pertains to improvements in automatic sound reproducing machines or graphophones that operate to feed one record after another to and from the record rotating means or turntable in operative relation to the sound reproducing mechanism thereby to play the records in succession without attention on the part of the user excepting to start and stop the machine.

The general objects of my invention are to provide a graphophone of the aforesaid character that is designed to accommodate a relatively large number of disk records in compact arrangement and that will operate automatically to successively play the records as long as the machine is supplied with power; to provide means for turning the records over or reversing them so that each record is alternately played on opposite sides; to provide a machine of said class that will operate quietly in the shifting of the records so that there is no annoyance from mechanical sounds during the interim between the rendition of musical selections; to provide a graphophone of the class in question in which there are intermissions of substantially equal duration between the conclusion and starting of successive musical selections regardless of difference in length of the sound producing portions or grooves of the successive records; to provide a machine of the aforesaid class that is operated by power and wherein the power may be shut off at any time during a cycle of operation but which machine will continue to perform all of its functions until the cycle is completed so that the mechanism will be left in a predetermined condition, it being possible when the machine is in such predetermined condition to very simply and easily remove all or a part of the records from the machine, replace all or a part of the records by new ones if desired, and arrange them to meet the wishes of the auditors, thus making it possible to arrange a complete program and to repeat such program one time after another as long as the machine is left in operation, which is especially desirable in some instances, as when the machine is used in restaurants, motion picture theaters, dance halls, etc., and to provide simple means whereby the playing of any record may be arrested at any point in the selection and the machine operated to shift said record from the turntable and replace it by the next succeeding record from the magazine.

While it is desirable to operate the record shifting mechanism by suitable power, such as electricity, a spring motor is found preferable to any other means for driving the record rotating device or turntable, and it is a further object of my invention to provide means for winding the spring motor that is actuated by the power utilized for operating the aforesaid mechanism and that is so constructed as to restore the spring to a predetermined maximum tension upon each winding but that involves a feature that avoids overwinding of the spring and any injury which might result to the mechanism from such an abnormal condition.

The objects above enumerated, with others hereinafter appearing, are attained in the embodiment of the invention illustrated in the accompanying drawings wherein like reference characters designate corresponding parts throughout the several views. For the sake of clearness and so that the mechanical features may be illustrated on as large a scale as possible, I have omitted from the drawings the cabinet or casing wherein the mechanism is housed.

Figure 1:
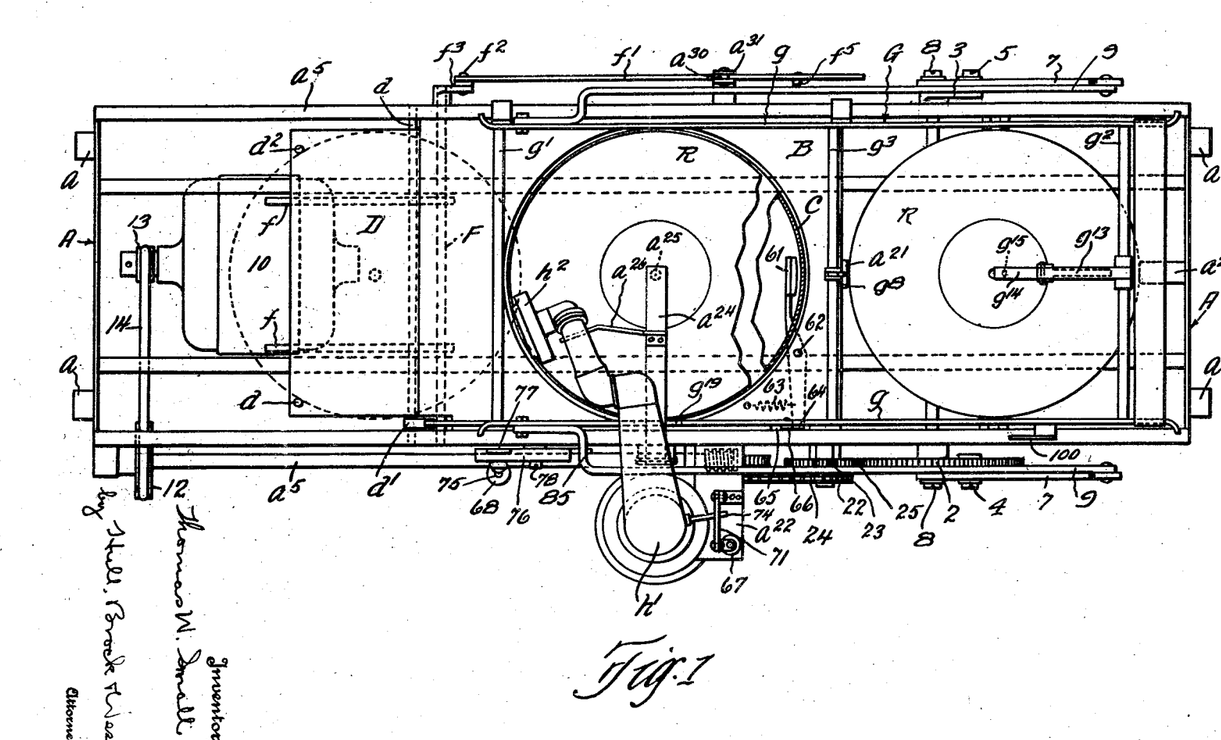
Fig. 1 is a plan view of my improved automatic graphophone.
Figure 3:
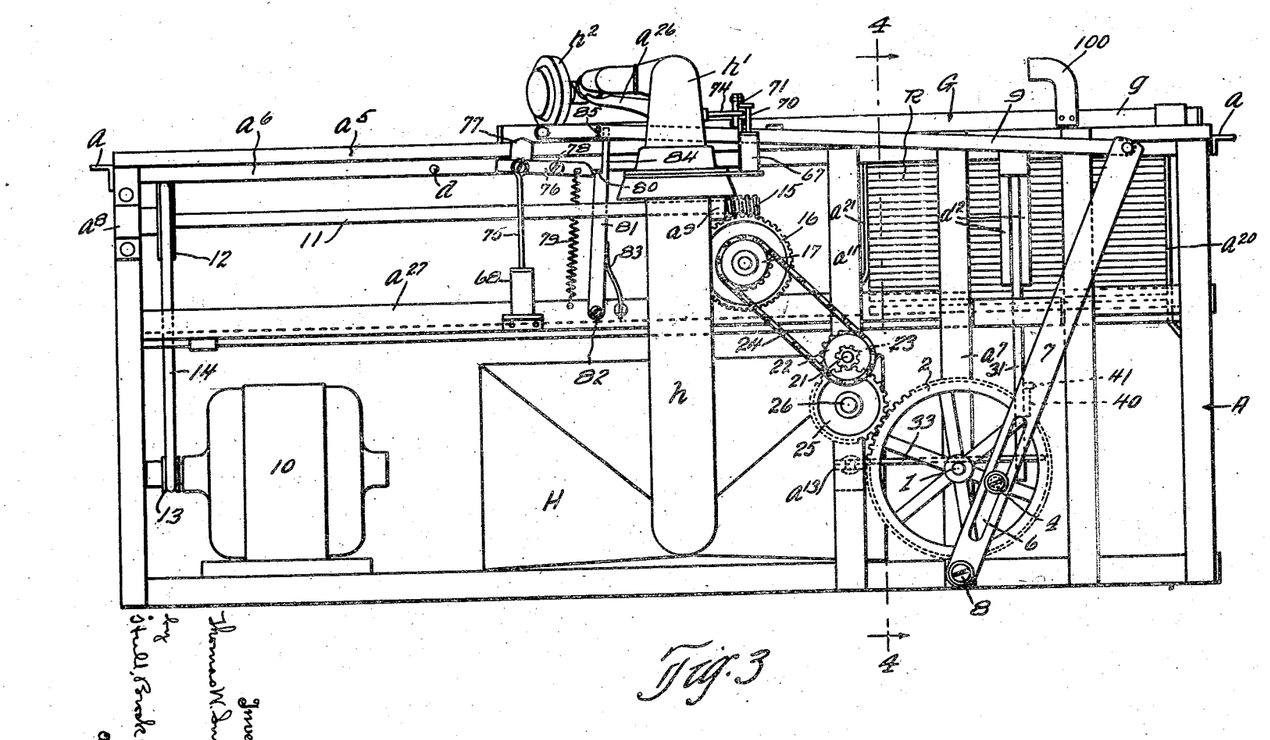
Fig. 3 is a rear elevation of the machine.
Figure 6:
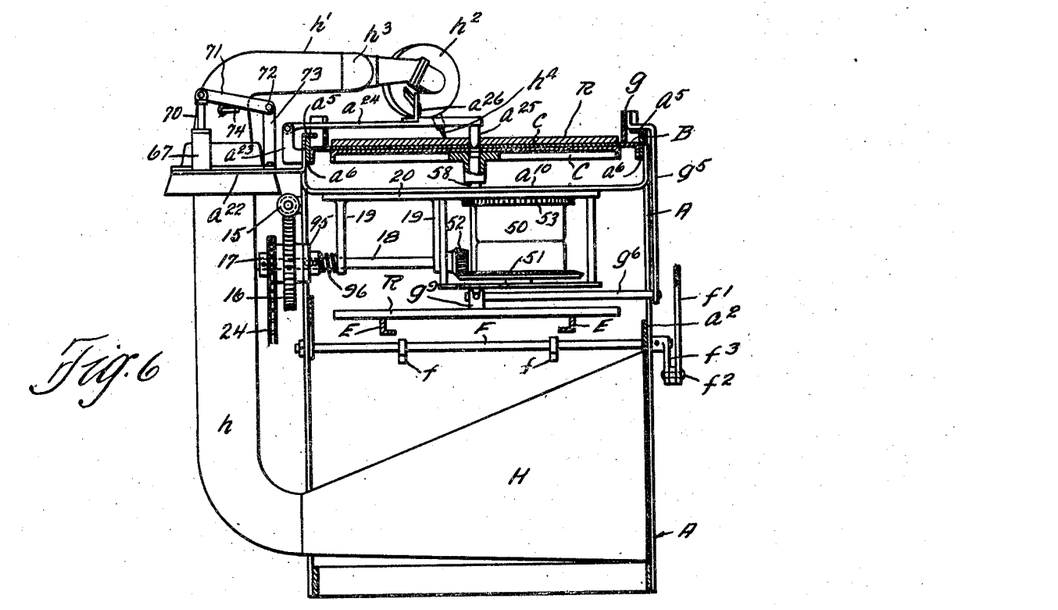
Fig. 6 is a vertical section from front to rear through the central portion of the machine.

The frame of the machine is a built-up structure of rectangular form and is designated generally by the reference character A. At each end it is provided with ledges $a$ by means of which it is adapted to be supported within a cabinet or casing (not shown). Supported by the frame A centrally within the upper portion thereof and in a horizontal position is a stationary table B having a circular opening within which a turntable C rotates, the upper surface of the stationary table B being in the same plane as the corresponding surface of the turntable C, as best shown in Fig. 6, the turntable being of the usual form and having its upper surface constituted of a sheet of felt or the like $c$. Beyond one end of the stationary table B (the left hand end as the machine is viewed in Fig. 1) is a leaf D that is fastened to a shaft $d$ which has its ends journaled in opposed parts of the frame A and to the rear end of the shaft D is secured an arm $d'$ (Figs. 1 and 3). Through the cooperation with this arm of parts hereinafter to be described, the same is normally maintained in a position to support the leaf D in the horizontal plane of the stationary table B. Near its free edge, the leaf is equipped with stops $d^2$.

Extending from end to end of the frame A a suitable distance below its top is a track comprised of angle rails E, and the upper surfaces of the vertical flanges of these rails are smooth and highly polished for a purpose presently to appear. Journaled within longitudinal members $a^2$ of the frame A are the ends of a rock shaft F which carries a pair of fingers $f$. It will be noted, especially from Fig. 6, that the fingers $f$ are located immediately inwardly of the rails E.

Figure 8:
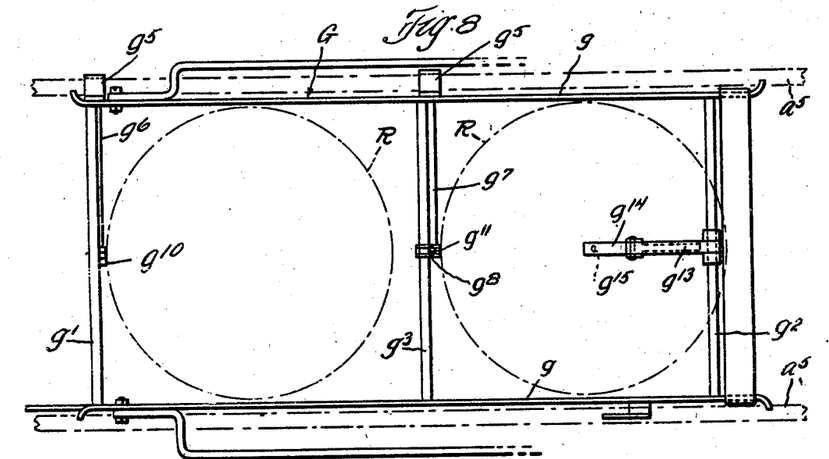
Fig. 8 is a plan view of the carriage.
Figure 9:
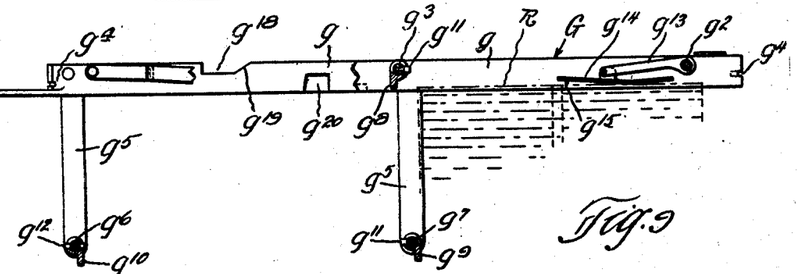
Fig. 9 is a side elevational view of the same, the right hand end of the view representing a central longitudinal section through the carriage.
Figure 10:
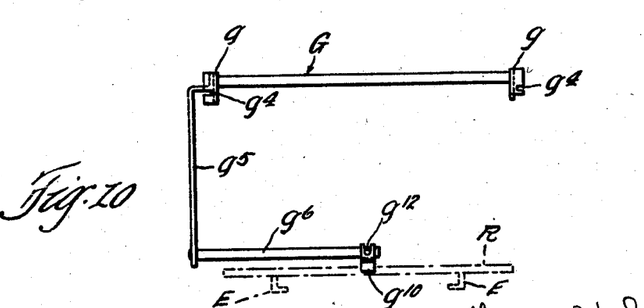
Fig. 10 represents a left hand end elevation of the carriage.

Reciprocable lengthwise of the top of the frame A is a carriage G that is shown in detail in Figs. 8, 9 and 10. This carriage is made up of side bars $g$ that are spaced apart at their ends by rods $g'$ and $g^2$ and intermediate their ends by a rod $g^3$. The ends of the side bars $g$ are curved outwardly and are notched as indicated at $g^4$ for the reception of the horizontal flanges of angle rails $a^5$ that are applied to and extend the full length of the opposite top side members $a^6$ of the frame A (see Fig. 6). Depending from the forward side of the carriage G are hangers $g^5$ that support rods $g^6$ and $g^7$. These rods extend rearwardly from the hangers $g^5$ a slight distance above the rails E, and slightly beyond the longitudinal center of the machine.

Supported for oscillation upon the respective rods $g^3$ and $g^7$ are lugs $g^8$ and $g^9$, and fixed against oscillation upon the rod $g^6$ is a similar lug $g^{10}$. The purpose of these lugs will presently appear. As a convenient means of securing the lugs $g^8$ and $g^9$ to the respective rods in such manner as will permit of their oscillation, I employ pins $g^{11}$ that extend through circumferential slots in the hubs of the lugs and are secured within apertures in the rods. The hub of the lug $g^{10}$ is similarly slotted, but in this instance a pin $g^{12}$ is extended diametrically through the rod and its opposite ends occupy the ends of the slot so that the lug is fixed against turning. Journaled upon the central portion of the rod $g^2$ is an arm $g^{13}$ which has pivotally connected to its outer end a shoe $g^{14}$ from the forward end of which a barb $g^{15}$ depends.

I shall next describe the mechanism for reciprocating the carriage G. Journaled within front and rear uprights $a^7$ of the machine frame is a shaft 1 to the rear end of which is secured a gear 2 and to the front end of which is fastened a crank 3. Carried by one of the spokes of the gear 2 is a crank pin 4 which is spaced the same distance from the axis of the shaft 1 as is the pin 5 of the crank 3. The crank pins 4 and 5 operate within slots 6 in arms 7 that are pivoted at 8 to the frame A below and in the vertical plane of the shaft 1. The free ends of the arms 7 are connected by links 9 to the forward ends of the side bars $g$ of the carriage G.

It is apparent from the foregoing that each time the shaft 1 makes a revolution the carriage G is given a complete reciprocation.

The shaft 1 is driven, through connections which I will now describe, by an electric motor 10 that is supported in the lower left hand side of the frame A (as the parts are viewed in Figs. 1 and 3). Journalled within bearings $a^8$ and $a^9$ that are supported by the frame A is a shaft 11 which has a pulley 12 secured to its end adjacent the bearing $a^8$ in the plane of a pulley 13 that is fastened to the motor shaft. A belt 14 is engaged about said pulleys. Where the shaft 11 extends beyond the bearing $a^9$ it is fitted with a worm 15 that meshes with a worm wheel 16, and fixed to the worm wheel is a sprocket 17. The unit comprised of the worm wheel 16 and sprocket 17 is loosely mounted on a shaft 18 (Figs. 6 and 14) that is supported in hangers 19 which depend from a supporting plate 20 of the spring motor by means of which the turntable is driven, as will presently appear. In all essential respects, the spring motor is of standard type. The plate 20 is sustained by a cross member $a^{10}$ of the machine frame. Supported upon a stud 21 (Fig. 3), that is carried by an upright member $a^{11}$ at the rear of the frame A, is a unit comprised of a sprocket wheel 22 and a pinion 23. The former has engaged about it a chain 24 which also cooperates with the previously mentioned sprocket 17 and the pinion 23 meshes with an idler gear 25 that is journaled on a stud 26 supported by the previously mentioned upright $a^{11}$. The idler 25 meshes with the gear 2.

Figure 4:
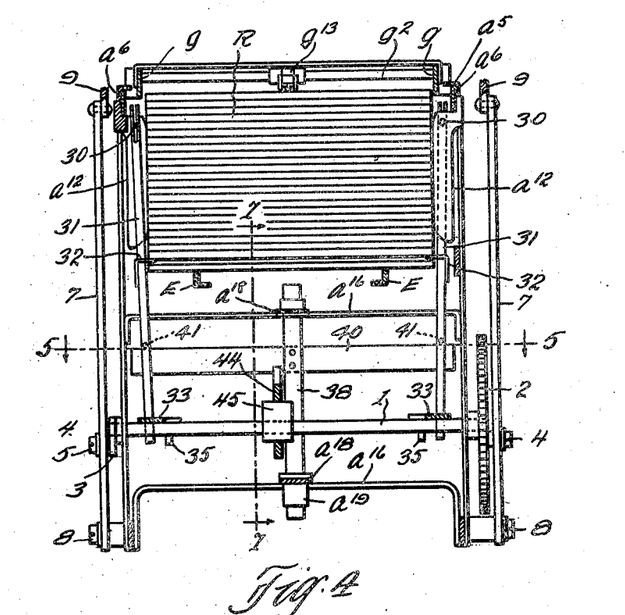
Fig. 4 is a vertical section substantially on the line 4—4 of Fig. 3.
Figure 5:
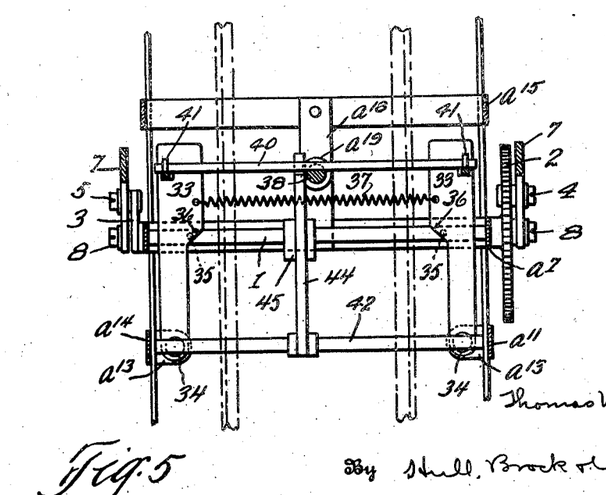
Fig. 5 is a fragmentary sectional plan on the line 5—5 of Fig. 4.
Figures 12, 13, 14:
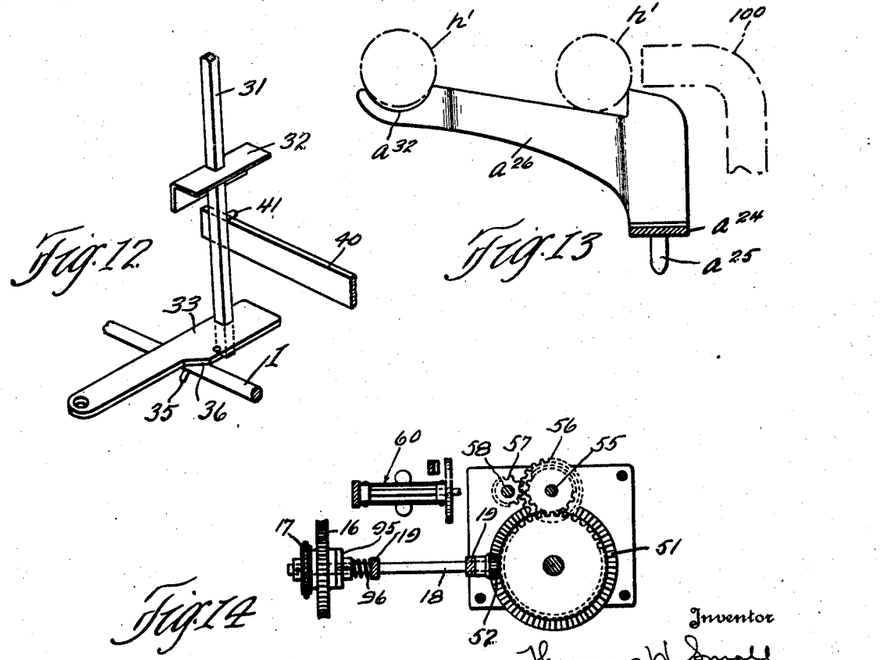
Fig. 12 is a detail in perspective of parts of the record elevating mechanism.
Fig. 13 is a detail of the tone arm returning means.
Fig. 14 is a sectional plan of the spring motor for operating the turntable showing the connections through which the same is wound.

As will presently appear, the leaf D and the fingers $f$, with their respective actuating mechanisms, constitute the record reversing means, and occupying the end of the frame A opposite said record reversing means, and above the rails E, is the record magazine. Secured to the front and rear frame members $a^6$ are opposed guides $a^{12}$ (see Fig. 4) that are spaced apart a distance substantially equal to that of the diameter of a record. Each guide is shown as comprised of spaced apart side plates by and between the upper ends of which are supported pins 30; and occupying the space between the side plates of the respective guides $a^{12}$ are bars 31 whose upper ends are bifurcated to receive the pins 30. The bars 31 are preferably square in cross section, as best shown in Figs. 5 and 12, and secured to the bars a slight distance above the horizontal plane of the rails E are relatively thin record supporting ledges 32. By reason of the nature of the connection between the bars 31 and the pins 30, said bars are capable of a lifting and a swinging movement, the swinging movement being confined, in part by the side plates of the guide members $a^{12}$, to a direction from front to rear of the machine. The lower ends of the bars 31 occupy appropriately shaped openings in cam plates 33 (Figs. 5 and 12) that are pivoted at their ends opposite said openings on members 34 that are carried by brackets $a^{13}$ which extend inwardly from the previously mentioned rear upright frame member $a^{11}$ and a corresponding front upright frame member $a^{14}$. The cam plates 33 bear upon the shaft 1, and said shaft is equipped with pins 35 that are in a position to engage cam faces 36 of said plates as the shaft rotates, thereby to spread the plates apart against the tension of a spring 37 which connects the free ends of said plates.

Figure 7:
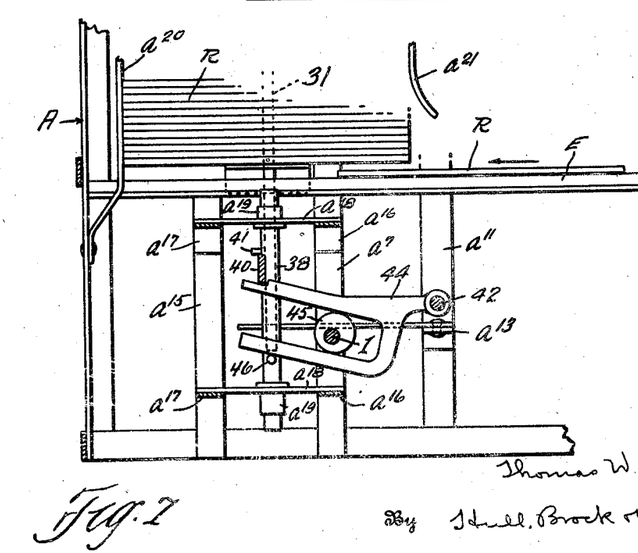
Fig. 7 is a partial longitudinal section showing the record elevating mechanism the plane of section being designated by the line 7—7 of Fig. 4.

Intermediate the frame uprights $a^7$ wherein the shaft 1 is journaled and the adjacent end of the machine are similar front and rear uprights $a^{15}$, and carried by the respective pairs of uprights $a^7$ and $a^{15}$ are vertically spaced cross members $a^{16}$ and $a^{17}$ (Fig. 7). The middle portions of the vertically spaced cross members $a^{16}$ and $a^{17}$ are connected by members $a^{18}$ which are equipped with bushings $a^{19}$ through which a post 38 is guided. A cross arm 40 is secured to the post 38 and its opposite ends serve to support the bars 31 through the intervention of pins 41 that are carried by said bars. Journaled on a rod 42 that is supported by and between the frame member $a^{11}$ and $a^{14}$ is a forked lever 44 whose upper branch terminates beneath the arm 40 adjacent the latter's connection with the post 38. The forked lever embraces a cam 45 that is secured to the shaft 1 and the lower branch of the lever bears against the pin 46 which extends laterally from the post 38. It is apparent from the arrangement above described that when the shaft 1, and consequently the cam 45, rotates, the lever 44 will be rocked on its pivot, constituted of the rod 42, to elevate the bars 31 through the medium of the arm 40.

In addition to the previously mentioned guides $a^{12}$, other guides $a^{20}$ and $a^{21}$ are employed for maintaining the records in vertical alignment in the magazine as they lie one upon another in horizontal arrangement, the lower end of the guide $a^{21}$ being spaced a suitable distance above the plane of the rails E and flared outwardly to serve as a deflector for pushing the lower records into alignment with the ones above as the stack is lifted from time to time by the ledges 32 and the mechanism associated therewith.

The sound reproducing apparatus is comprised of the usual elements. A horn H is housed within the lower central portion of the frame A and opens through the front of the machine. A tube $h$ leads from the rear end of the horn upwardly to a point adjacent the top of the frame A where it is supported by a plate $a^{22}$, and rotatably connected to the upper end of said tube $h$ in the usual way is the tone arm $h'$ which carries the sound reproducer $h^2$ at its forward end, the tone arm involving a joint $h^3$ which permits the section supporting the reproducer to be raised and lowered with respect to the rear portion of the arm. The needle or stylus of the sound reproducer is designated $h^4$.

Pivotally connected to a bracket $a^{23}$ that rises from the rear upper edge of the frame A in substantially the vertical plane of the tube $h$, is the rear end of a lever $a^{24}$ that carries a centering pin $a^{25}$ at its forward end for cooperation with the holes of the records for properly locating them in playing position on the turntable C. Surmounting the lever $a^{24}$ is a guide $a^{26}$ (Figs. 6 and 13) for cooperation with the vertically movable portion of the tone arm. The lever $a^{24}$ rests upon the rear side rail $g$ of the carriage G, and when the parts are in playing position said lever occupies a notch $g^{18}$ formed in the upper edge of said side rail, one end of said notch being inclined, as shown best in Fig. 9, to constitute a cam that is designated $g^{19}$.

As previously stated, the spring motor for operating the turntable is of standard construction and, as will appear from Figs. 6 and 14, the same comprises a spring enclosing drum 50 that is in two sections, the lower section having a beveled gear 51 that meshes with a beveled pinion 52 on the forward end of the previously mentioned shaft 18. The spring (not shown) is wound when the lower section of the drum is rotated through said gearing, and a gear wheel 53 on the upper section of the drum drives, through suitable gearing cooperating with the gear 53, a shaft 55 which, in turn, is geared through pinions 56 and 57 with the shaft 58 which carries the turntable. The speed of the turntable is controlled in the usual way by a governor that is designated generally by the reference numeral 60.

A brake 61, shown in Fig. 1, cooperates with the inner side of the peripheral flange of the turntable for stopping the rotation of the table, said brake being in the nature of a lever that is pivoted at 62 to the stationary table B and is thrown to effective position by means of a spring 63. The end 64 of the brake lever rises through a slot 65 in the table B in a position to be engaged by a projection 66 on the rear side rail $g$ of the carriage G.

Figure 11:
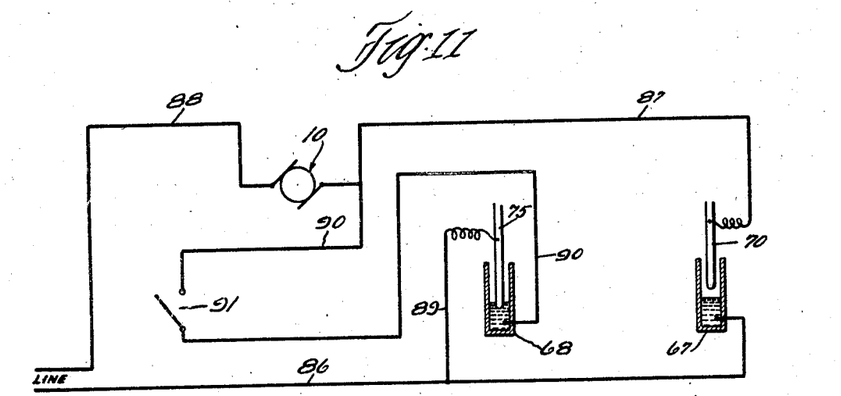
Fig. 11 is a diagram of the electric circuit involved in the machine.

The circuits through which current is supplied to the motor 10 are shown in the diagram of Fig. 11 and the same involve two switches 67 and 68, preferably of the mercury cup type. The switch 67 is shown in Figs. 1, 3 and 6 as mounted upon the plate $a^{22}$ adjacent the fulcrum of the tone arm $h'$, and the plunger 70 of said switch depends from the rear end of a lever 71 that is pivoted at 72 to a bracket 73 that rises from the plate $a^{22}$. Arranged to coact with the underside of the lever 71 is a pin 74 that extends laterally from the tone arm, and the lever is inclined so that as the tone arm swings to the left, as the parts are viewed in Fig. 1, it will move the pin 74 forwardly and elevate the rear end of the lever 71 thereby to withdraw the plunger 70 from the mercury within the cup of the switch 67. In other words, the tone arm will act to open said switch when it is swung in a direction to locate the sound reproducer $h^2$ in starting position adjacent the periphery of a record supported by the turntable.

As will appear particularly from Fig. 3, the switch 68 is supported by a rear longitudinal frame member $a^{27}$ and the upper end of the plunger 75 of said switch is pivoted to one end of a lever 76 that carries an abutment 77. The lever 76 is pivoted at 78 to an adjacent part of the machine frame, and it is rocked by a spring 79 in a direction to elevate the end having the abutment 77 and to which the plunger is attached. The opposite end of the lever cooperates with the nose 80 of a latch 81 that is pivoted at 82 to the aforesaid frame member $a^{27}$, and a spring 83 tends to rock said latch in a direction to engage its nose 80 with the adjacent end of the lever 76. An extension 84 of the latch is adapted to be engaged by an offset portion 85 of the rear link 9 through which the adjacent side of the carriage G is connected to the corresponding arm 7.

Referring now to the circuit diagram of Fig. 11, a conductor 86 leads from one side of the "line" (which represents the source of current) to one side of the switch 67. The opposite side of said switch is connected, through a conductor 87, with the motor 10, and the current returns through a conductor 88 to the opposite side of the "line" or source. A conductor 89 leads from the conductor 86 to one side of the switch 68, while the opposite side of the switch is electrically connected through a conductor 90 with the motor 10, said conductor 90 including a manually operated switch 91.

As the machine is illustrated in the drawings, the parts are in playing condition. A record R is on the turntable C, the lever $a^{24}$ is down with the centering pin $a^{25}$ in the hole of the record, and the brake 61 is released so that the spring motor may rotate the turntable. With the parts in this condition, the switches 67 and 68 are both open wherefore the circuit of the motor 10 is broken at two points and the mechanism actuated thereby is at rest. It will be assumed, however, that the manually operated switch 91 is closed. As the record rotates, the needle or stylus of the sound reproducer $h^2$ will follow the groove of the record in the usual way and as it approaches the center of the record the pin 74 on the tone arm $h'$ will move rearwardly and allow the plunger 70 to dip into the mercury in the cup of the switch 67 thereby to close said switch and establish a circuit through the motor 10 by way of the conductors 86, 87 and 88. Upon the energization of the motor 10, the shaft 11 will be driven to rotate the unit comprised of the worm wheel 16 and sprocket 17. A friction disk 95 is mounted on the shaft 18 adjacent the hub of the worm wheel 16 and the same is urged into frictional engagement with said hub by a spring 96 that surrounds the shaft and is compressed between the hub of said disk and the adjacent hanger 19. The disk 95 is splined to the shaft 18, and when the tension of the spring of the turntable motor is inferior to the friction between the disk 95 and the worm wheel, the shaft 18 will be driven through the medium of the friction disk to wind the spring of the turntable motor. When said spring has attained a predetermined tension, the disk 95 will slip on the worm wheel and avoid undue strain being imposed upon the parts. Thus it will be seen that each time the electric motor operates it rewinds the spring motor to its maximum tension.

Figure 2:
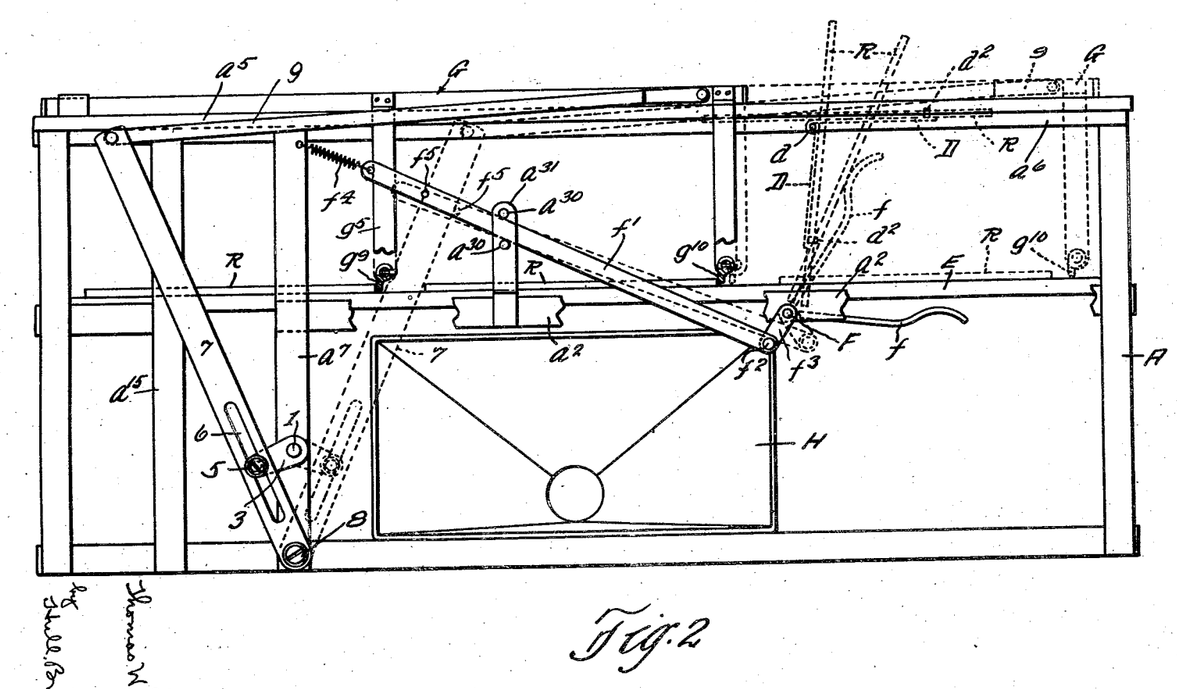
Fig. 2 is a front elevation of the same, certain parts being broken away to reveal otherwise hidden structural features, and other parts being omitted to avoid confusion of lines.

From the time the shaft 11 starts rotating the power is transmitted therefrom through the train of gearing previously described to the gear 2 that is secured to the shaft 1. As the shaft 1 rotates, the arms 7 are swung on their pivots 8 to reciprocate the carriage G through the intervention of the links 9. As the carriage advances the cam edge $g^{19}$ of the notch $g^{18}$, that is occupied during the playing position by the lever $a^{24}$, engages said lever and lifts it thereby to withdraw the centering pin $a^{25}$ from the hole of the record that is on the turntable and at the same time it elevates the sound reproducer $h^2$ through the tone arm guide $a^{26}$. The lug $g^8$ will engage the edge of the record on the turntable and will shift said record forwardly until its advancing edge strikes the stops $d^2$ on the leaf D of the record reversing mechanism; and simultaneously with this removal of the record from the turntable, the topmost record in the magazine is moved onto the turntable by means of the shoe $g^{14}$, as I shall now explain. Immediately after the carriage starts on its forward excursion the barb $g^{15}$ of the shoe $g^{14}$ drops into the hole of the topmost record in the magazine and shoves said record across the adjacent end of the stationary table B and onto the turntable. By the time the last mentioned record arrives at playing position on the turntable, a notch $g^{20}$ in the rear side rail $g$ of the carriage assumes a position directly above the arm $d'$ on the shaft $d$ permitting the shaft to rock and the leaf D that is secured thereto to drop to a substantially vertical position, as indicated in dotted lines in Fig. 2. At the same time the fingers $f$ on the shaft F are rocked upwardly into contact with the record through the medium of a link $f'$ that has one of its ends pivoted at $f^2$ to the outer end of an arm $f^3$ that is secured to the forward extremity of the shaft F. The link $f'$ is shown as reciprocably supported between guides $a^{30}$ on a standard $a^{31}$ that is supported by the frame member $a^2$; and the end of the link opposite the arm $f^3$ is connected by a spring $f^4$ to the front upright $a^7$ of the frame. A pin $f^5$ projects from the side of the link $f'$ in the path of the forward arm 7 so that as said arm swings toward its extreme right hand position, as the parts are viewed in Fig. 2, it will project the link against the tension of the spring $f^4$ and rock the shaft F as above explained. Inasmuch as the lower edge of the record projects a considerable distance below the corresponding edge of the leaf D, when the leaf is in its dropped position, the fingers $f$ adjacent their connections with the shaft F strike the disk below said leaf and rock it over the edge of the leaf so as to swing the upper portion of the record over and against the free end portions of the fingers. As the arm 7 starts on its return movement the spring $f^4$ retracts the link $f'$ and, through the arm $f^3$ and shaft F, lowers the fingers $f$ to their normal position and, in returning to this position, the fingers gently lower the record onto the rails E and without any perceptible noise.

It is to be noted from the above operation that as the record is acted upon by the leaf D and fingers $f$, it is inverted with respect to the position it occupied on the turntable, and it will appear as the description proceeds that the record is returned to the magazine in this reversed position.

When the carriage G is advanced to its extreme forward position, the lug $g^{10}$ will occupy a position forwardly of the record that has just been deposited upon the rails E so that when the carriage is returned to its normal position, said lug will engage said record and slide it to a position intermediate the one wherein it was deposited upon the rails by the fingers $f$ and a position beneath the records in the magazine. A record occupying this intermediate position is adapted to be engaged by the lug $g^9$ when the carriage is in its extreme forward position. Consequently, as the carriage returns and moves the record from the reversing mechanism to the center or intermediate position, the record previously shifted from the turning mechanism to immediate position is advanced by the lug $g^9$ to its position beneath the records in the magazine. The polished top surfaces of the rails E insure easy movement of the records and prevent injury thereto.

While the shaft 1 is making a rotation to accomplish the operations above described, the pins 35 carried by said shaft engage the cam faces 36 of the plates 33 thereby to swing said plates outwardly against the tension of the spring 37 and impart, through the medium of said plates, a like movement to the lower ends of the bars 31 thereby to withdraw the record supporting ledges 32 from beneath the records of the magazine, allowing said records to drop a very slight distance, substantially the thickness of the ledges 32, onto the record which is supported by the rails E. With the shaft 1 the cam 45 is rotated to lower the forked lever 44 and the cross arm 40 thereby to permit the bars 31 to drop while they are maintained spread apart by the plates 33 to a position wherein the ledges 32 occupy a plane beneath the record that rests upon the rails E; and as the cam 45 continues to rotate it returns the forked lever 44 to its normal position thereby to elevate the cross arm 40 and the bars 31 so as to lift the records within the magazine to a position wherein the topmost record is in the plane of the table B and the lowermost record is high enough above the rails E to permit a record to be pushed beneath it.

As the carriage G approaches its extreme forward position, a finger 100 that rises from the rear side of the carriage G engages the tone arm $h'$ and slides it along the upper inclined edge of the guide $a^{26}$ to starting position and until the arm drops within the depression $a^{32}$ that is formed at the outer end of said guide (Fig. 13). As the tone arm is swung toward starting position, as above described, the pin 74 cams the lever 71 upwardly and withdraws the plunger of switch 70 from the mercury within the cup of switch 67, thus opening the switch and breaking the motor circuit at this point. However, prior to the breaking of the circuit at this point, it is made through the switch 68 shortly after the start of the carriage in the forward direction. As soon as the offset portion 85 of the rear link 9 strikes the abutment 77 on the lever 76, it depresses said lever against the tension of the spring 79 thereby to depress the plunger 75 and project it into the mercury in the cup of switch 68 and re-engage the nose 80 of the latch 81 with the adjacent end of the lever 76 so as to hold said lever in its newly assumed position until the latch is again withdrawn from the lever through the striking of its extension 84 by the offset portion 85 of the link 9 which does not occur until the carriage resumes its fully retracted position. Therefore, so long as the manually operated switch 91 is closed, and notwithstanding the fact that switch 67 is open, the motor will continue to receive a supply of current.

When it is desired to stop the machine the manually operated switch 91 is opened. If this is done during the playing of a record or at any time prior to the shifting of a played record from the turntable and the delivery of another record thereto from the magazine, the machine will continue to operate by reason of the fact that the motor 10 is supplied with current through the circuit including the switch 67, said switch remaining closed as above explained until the tone arm is swung to starting position by means of the finger 100. Now, assuming that the switch 91 is opened and that the finger 100 has returned the tone arm to starting position, the plunger 70 of the switch 67 will be withdrawn from the mercury in the switch cup and the motor will stop. Thus, when the machine stops the carriage will be in its forward position with the lever $a^{24}$ lifted thereby to sustain the centering pin $a^{25}$ out of engagement with the disk and the sound reproducer with its needle or stylus free from the record and with the carriage entirely withdrawn from above the magazine. With the parts in this condition all, or any part, of the records may be lifted from the magazine and re-arranged as desired, and the record on the turntable may be removed and another substituted therefor at will. This latter operation may be facilitated by swinging the shoe $g^{14}$ and the arm $g^{13}$ by which it is carried upwardly and out of the way, about the rod $g^2$ on which said arm is pivoted. The turntable is, of course, held against operation by the brake 61 at all times excepting when the carriage G is in its normal position, that is, the position which it occupies when a record is being played.

Having thus described my invention, what I claim is:—

1. In a graphophone of the class set forth, the combination of a horizontal turntable, a sound reproducer associated therewith, means for rotating the turntable, means for supporting records horizontally one upon another in a stack, and mechanism for sliding a record from the top of the stack onto the turntable, and returning it from the turntable to the bottom of the stack.

2. In a graphophone of the class set forth, the combination of a horizontal turntable, a sound reproducer associated therewith, means for rotating the turntable, means for supporting records horizontally one upon another in a stack, mechanism for sliding a record from the top of the stack onto the turntable and returning it from the turntable to the bottom of the stack, and means for reversing the record between its removal from and its return to the stack.

3. In a graphophone of the class set forth, the combination of a horizontal turntable, a sound reproducer associated therewith, means for rotating the turntable, means for supporting records horizontally one upon another in a stack, means for reversing the records, and mechanism for removing the records successively from the top of the stack, placing them on the turntable, removing them therefrom and delivering them to the record reversing means, and shifting them from said reversing means to the bottom of the stack.

4. In a graphophone of the class set forth, the combination of a horizontal turntable, a sound reproducer associated therewith, means for rotating the turntable, a magazine situated at one side of the turntable for accommodating a stack of records with the records resting one upon another in a horizontal position, record reversing means located at the opposite side of the turntable, and mechanism for removing records successively from the top of the stack and placing them on the turntable, transferring them from the turntable to the reversing means, and shifting them from the reversing means to the bottom of the stack.

5. In a graphophone of the class set forth, the combination of a horizontally fixed turntable, a sound reproducer associated therewith, means for rotating the turntable, a magazine situated at one side of the turntable for accommodating a stack of records with the records resting one upon another in horizontal position, and mechanism arranged to engage the center hole of a record for removing records successively from the top of the stack and placing them on the turntable in operative relation thereto and to the sound reproducer, and mechanism operable independently of said turntable for returning the records from the turntable to the bottom of the stack.

6. In a graphophone of the class set forth, the combination of a horizontal turntable, a sound reproducer associated therewith, means for rotating the turntable, a magazine situated at one side of the turntable for accommodating a stack of records with the records resting one upon another in horizontal position, record reversing means located at another side of the turntable, and mechanism arranged to engage the center hole of a record for removing records successively from the top of the stack and placing them on the turntable in operative relation thereto and to the sound reproducer, and means arranged to engage the edge of the records for transferring them from the turntable to the reversing means and for shifting them from the reversing means to the bottom of the stack.

7. In a graphophone of the class set forth, the combination of a horizontal turntable, a sound reproducer associated therewith, means for rotating the turntable, a track below and substantially parallel to the turntable, a support for records located at one side of the turntable and above the corresponding end of the track, said support being adapted to sustain a stack of records with the topmost record of the stack in substantially the plane of the turntable, means beyond the opposite side of the turntable for lowering records onto the track, and mechanism for shifting records successively from the top of the stack onto the turntable, from the turntable to the record lowering means, and along said track from said lowering means to the bottom of the stack.

8. In a graphophone of the class set forth, the combination of a horizontal stationary table, a horizontal turntable disposed approximately in the plane of the stationary table and between the opposite ends thereof, a sound reproducer associated with the turntable, means for rotating the turntable, a track below and substantially parallel to the stationary table, a support for records located beyond one end of the stationary table and above the corresponding end of the track, said support being adapted to sustain a stack of records with the topmost record of the stack in substantially the plane of the stationary table, means at the opposite end of the stationary table for reversing records and depositing them on the track, and mechanism for shifting records successively from the top of the stack onto the turntable, from the turntable to the reversing means, and along said track from the reversing means to the bottom of the stack.

9. In a graphophone of the class set forth, the combination of a horizontal turntable, a sound reproducer associated therewith, means for rotating the turntable, a track disposed below the turntable, a support for a stack of records situated at one side of the turntable, record reversing means located at the opposite side of the turntable for receiving records therefrom and depositing them in reverse position upon the track, and mechanism for shifting records successively from the top of the stack onto the turntable, from the turntable to the record reversing means, and along said track from said reversing means to the bottom of the stack.

10. In a graphophone of the class set forth, the combination of a horizontal turntable, a sound reproducer associated therewith, means for rotating the turntable, a support for a stack of records located at one side of the turntable, record reversing means situated at the opposite side of the turntable, a track below the turntable and extending from the reversing means to the record support, a carriage reciprocable in the direction of the track, means for reciprocating the carriage, means on the carriage for engaging the topmost record of the stack and shifting the same to operative position on the turntable, further means on the carriage for shifting a record from the turntable to the record reversing means, said means acting to reverse a record and deposit it upon the track, and further means on the carriage for engaging a record on the track and shifting it toward the support.

11. In a graphophone of the class set forth, the combination of a horizontal turntable, a sound reproducer associated therewith, means for rotating the turntable, a support for a stack of records located at one side of the turntable, record reversing means situated at the opposite side of the turntable, a track below the turntable and extending from the reversing means to the record support, a carriage reciprocable in the direction of the track, means for reciprocating the carriage, means on the carriage for engaging the topmost record of the stack and shifting the same to operative position on the turntable, further means on the carriage for shifting a record from the turntable to the record reversing means, connections through which the record reversing means is actuated by the carriage to reverse a record and deposit it upon the track, and further means on the carriage for engaging a record on the track and shifting it toward the support.

12. In a graphophone of the class set forth, the combination of a horizontal turntable, a sound reproducer associated therewith, means for rotating the turntable, a support for sustaining a stack of records in horizontal position with the topmost record substantially in the plane of the turntable, record lowering means located at the other side of the turntable, a track situated below the turntable and extending from said lowering means to a point beneath the record support, means for shifting records successively from the top of the stack to the turntable and from the turntable to the record lowering means, said lowering means acting to deposit the record on the track, and means for shifting the record along the track to a position below the stack sustained by the support.

13. In a graphophone of the class set forth, the combination of a horizontal turntable, a sound reproducer associated therewith, means for rotating the turntable, a support for sustaining a stack of records in horizontal position with the topmost record substantially in the plane of the turntable, record reversing means located at the other side of the turntable, a track situated below the turntable and extending from the reversing means to a point beneath the record support, means for shifting records successively from the top of the stack to the turntable and from the turntable to the reversing means, said reversing means acting to turn the record over and deposit it on the track, means for shifting the record along the track to a position below the stack sustained by the support, and means for reciprocating the support vertically, the support acting during such reciprocation to lift a record from the track and deposit it on the bottom of the stack.

14. In a graphophone of the class set forth, the combination of a horizontal turntable, a sound reproducer associated therewith, means for rotating the turntable, a record support for sustaining a stack of records in horizontal position with the topmost record substantially in the plane of the turntable, record lowering means located at the other side of the turntable, a track below the turntable and extending from said lowering means to a point below the record support, means for shifting successive records from the top of the stack to the turntable, from the turntable to the record lowering means and from said lowering means along said track to a point below the record support, the record support involving opposed depending members having ledges for supporting the stack of records, said members being movable vertically toward and from each other, and mechanism for spreading said members so as to remove their ledges from beneath the stack so that the stack may be brought to bear upon a record on the track, lowering said members and moving them toward each other so as to engage their ledges beneath the record on the track, and for elevating said members thereby to lift the stack including said record.

15. In a graphophone of the class set forth, the combination of a horizontal turntable, a sound reproducer associated therewith, means for rotating the turntable, a record support for sustaining a stack of records in horizontal position with the topmost record substantially in the plane of the turntable, record reversing means located at the other side of the turntable, a track below the turntable and extending from the reversing means to a point below the record support, means for shifting successive records from the top of the stack to the turntable, from the turntable to the reversing means and from the reversing means along said track to a point below the record support, the record support involving opposed depending members having ledges for supporting the stack of records, said members being movable vertically and toward and from each other, and mechanism for spreading said members so as to remove their ledges from beneath the stack so that the stack may be brought to bear upon a record on the track, lowering said members and moving them toward each other so as to engage their ledges beneath the record on the track, and for elevating said members thereby to lift the stack including said record.

16. In a graphophone of the class set forth, the combination of a horizontal turntable, a sound reproducer associated therewith, means for rotating the turnable, a record support located at one side of the turntable for sustaining a batch of records with the topmost record of the stack substantially in the plane of the turntable, a track below the turntable and extending at one end beneath the record support, means at the side of the turntable opposite the record support for depositing a record removed from the turntable onto the track, a carriage shiftable in the direction of the track, a shaft, means for rotating the shaft, connections between the shaft and the carriage whereby the carriage is reciprocated upon each rotation of the shaft, means on the carriage for engaging the topmost record of the stack and shifting it to the turntable, means on the carriage for engaging a record on the turntable and shifting it to the aforesaid depositing means, and further means on the carriage for shifting a record from the depositing means along the track to a position below the record support, the record support comprising opposed members having ledges whereon a batch of records are supported, said members being movable vertically and toward and from each other, movable cam plates to which the lower ends of which said members are operatively connected, means on said shaft for engaging said plates to shift them so as to move said members away from each other so as to release the stack and allow it to be deposited on a record on the track, the aforesaid plates being permitted when the shaft reaches a given point in its cycle to approach each other thereby to project their ledges beneath the record on the track, and a cam on said shaft for elevating said members thereby to lift the stack of records from the track.

17. In a graphophone of the class set forth, the combination of a turntable, sound reproducing means shiftable thereover between starting and finishing positions, an electric switch arranged to be closed by said means as it reaches finishing position, a device movable in a plane parallel to the turntable for delivering records to and removing them from the turntable, said device incorporating a part cooperating with and serving to shift the sound reproducing means to starting position as it delivers a record to the turntable, a second electric switch arranged to be closed by said device during the delivery of a record to the turntable, an electric motor for actuating said device, and an electric circuit including said motor and having two branches, each branch involving one of the aforesaid switches.

18. In a graphophone of the class set forth, the combination of a turntable, sound reproducing means shiftable thereover between starting and finishing positions, an electric switch arranged to be closed by said means as it reaches finishing position, a device movable in a plane parallel to the turntable for delivering records to and removing them from the turntable, said device incorporating a part cooperating with and serving to shift the sound reproducing means to starting position as it delivers a record to the turntable, a second electric switch arranged to be closed by said device during the delivery of a record to the turntable, an electric motor for actuating said device, an electric circuit including said motor and having two branches in each of which is one of the aforesaid switches, and a manually operated switch in the branch containing the second electric switch.

19. In a graphophone of the class set forth, the combination of a horizontal turntable and a tone arm pivoted adjacent the side of said turntable and overhanging the same, a sound reproducer carried by the tone arm for cooperation with a record on the turntable, a support for records adjacent the side of the turntable, a carriage reciprocable in a plane parallel to the turntable for shifting records from said support to the turntable, an electric motor for reciprocating the carriage, driving means for the turntable, an electric switch, means actuated by the tone arm as the latter is moved adjacent the center of the turntable by the cooperation of the sound reproducer with the sound groove of the record for opening said switch, a second electric switch that is closed by the carriage as it starts on its movement to shift a record to the turntable and is opened by said carriage as the latter returns to its starting position, an electric circuit involving said motor and having two branches in each of which is one of the aforesaid switches, and a manually operated switch in the branch with the second of the aforesaid switches.

20. In a graphophone of the class set forth, the combination of a turntable, means for rotating the same, a brake for holding the turntable against rotation, means tending to move the brake to effective position, a record support located at one side of the turntable, a carriage reciprocable across the turntable and said support for shifting records from the support to the turntable, means for reciprocating the carriage, a control member for discontinuing the operation of said carriage reciprocating means when said carriage arrives at a position for initiating the shifting of a record from the support to the turntable, and means on the carriage for rendering the aforesaid brake ineffective when the carriage occupies the aforesaid position.

21. In a graphophone of the class set forth, the combination of a frame structure incorporating a horizontal track comprised of laterally spaced parallel rails, a stationary table between said rails substantially midway between the ends of the track, a turntable inset within the stationary table so that its record supporting surface is in substantially the plane of the top surface of the stationary table, means for rotating the turntable, a support located in one end of the frame for sustaining a stack of records with the topmost record in approximately the plane of the stationary table, a leaf hingedly supported adjacent the end of the stationary table opposite the support, a carriage reciprocable along the track, the carriage normally reposing adjacent the end of the track where the record support is situated, means cooperating with said carriage for sustaining the aforesaid leaf in a horizontal position when the carriage is in any but a position adjacent the end of the track opposite the record support, means on the carriage for shifting a record from the support to the turntable, further means on the carriage for shifting a record from the turntable onto the aforesaid leaf, a track supported by the frame structure below and in a plane substantially parallel with the first mentioned track and extending in the same direction as the former track, means for receiving a record from said leaf as the latter swings from horizontal position and for depositing said record upon the second mentioned track, means on the carriage for shifting records from the position in which they are deposited upon the second track along said track to a position beneath the records in the record support, means for lowering the records in the support upon the record sustained therebelow on the second mentioned track and subsequently picking up the stack through the intervention of said record, and sound reproducing means associated with the turntable.

22. In a graphophone of the class set forth, the combination of a frame structure, a horizontal track sustained by said structure, a carriage reciprocable along the track, a horizontal turntable located within the track, a record support located at one side of the turntable for sustaining a batch of records, the topmost record of the batch being in approximately the plane of the turntable, a carriage reciprocable along the track across said support and the turntable, means for reciprocating the carriage, means on the carriage for shifting a record from the support to the turntable, further means on said carriage for shifting a record from the turntable, a lever pivotally supported from the frame structure adjacent one side of the track and overhanging an adjacent side of the carriage, a centering device carried by the lever for cooperation with the center hole of a record on the turntable, the carriage cooperating with said lever in such manner as to elevate the lever and thus withdraw the centering device from the hole of the record when the carriage is in any but a position adjacent the end of the track at which the record support is located, a tone arm pivotally supported adjacent one side of the frame structure and overhanging the turntable, said arm being capable of vertical and horizontal movement, a sound reproducer carried by the tone arm for cooperation with a record on the turntable, the tone arm being swung horizontally across the record toward the center thereof by the cooperation of the stylus of the sound reproducer with the sound groove of the record, a tone arm guide on said lever, the aforesaid lever serving to lift the free end of the tone arm through the intervention of said guide when said lever is elevated, and means on the carriage for shifting the tone arm along the guide to dispose the sound reproducer adjacent the periphery of a record as the carriage is moved from normal position.

23. In a graphophone of the class set forth, the combination of a horizontal turntable and a sound reproducer associated therewith, means for rotating the turntable, a support for records adjacent one side of the turntable and arranged to support a record in substantially the plane of the turntable, a carriage reciprocable across said support and the turntable, and a shoe pivotally supported by the carriage and arranged to bear upon a record sustained by the support, said shoe having a barb that is adapted to engage the center hole of a record and shift the record from the support to the turntable as the carriage is moved in one direction.

24. In a graphophone of the class set forth, the combination of a horizontal turntable and a sound reproducer associated therewith, means for rotating the turntable, a support for records adjacent one side of the turntable and arranged to support a record in substantially the plane of the turntable, a carriage reciprocable across said support and the turntable, a shoe pivotally supported by the carriage and arranged to bear upon a record sustained by the support, said shoe having a barb that is adapted to engage the center hole of a record and shift the record from the support to the turntable as the carriage is moved in one direction, and means on the carriage for engaging the edge of a record on the turntable and shifting the record from the turntable simultaneously with the shifting of another record from the support onto the turntable, said means being pivotally connected to the carriage so as to ride over a record on the turntable when the carriage is moved in one direction and having a limited swinging movement so as to engage the edge of the record and shift the same when the carriage is moved in the opposite direction.

25. In a graphophone of the class set forth, the combination of a turntable and a sound reproducer associated therewith, means for centering a record on the turntable, a record support located at one side of the turntable and arranged to sustain a record in substantially the plane of the turntable, a carriage reciprocable across the support and turntable, means for reciprocating the carriage, an instrumentality controlled by the carriage and acting when the carriage is shifted in one direction to withdraw the centering device from the hole of a record on the turntable and elevate the sound reproducer, the carriage acting at the same time to remove said record from the turntable, transfer another record from the support to the turntable, and shift the sound reproducer to a position adjacent the periphery of the turntable, means on the carriage for so shifting the sound reproducer, the aforesaid instrumentality acting when the carriage is shifted in the opposite direction to project the centering device into the hole of a record on the turntable and lower the sound reproducer into engagement with said record, the carriage acting in the meantime to shift a record previously removed from the turntable to the record support, and means on the carriage for setting the turntable rotating means in operation.

26. In a graphophone of the class set forth, the combination of a horizontal turntable, a sound reproducer associated therewith, means for rotating the turntable, means for supporting a series of records horizontally one above another, mechanism for transferring a record from the top of the series to the turntable and returning it from the turntable to the bottom of the series, and means for reversing the record between its removal from and its return to the series.

27. In a graphophone of the class set forth, the combination of a horizontal turntable, a sound reproducer associated therewith, means for rotating the turntable, means for supporting a series of records horizontally one above another, means for reversing the records, and mechanism for moving the records successively from the top of the series, placing them on the turntable, removing them therefrom and delivering them to the record reversing means, and transferring them from said reversing means to the bottom of the series.

28. In a graphophone of the class set forth, the combination of a horizontal turntable, a sound reproducer associated therewith, means for rotating the turntable, a track below and substantially parallel to the turntable, a support for records located at one side of the turntable and above the corresponding end of the track, said support being adapted to sustain a series of records with the topmost record of the series in substantially the plane of the turntable, means beyond the opposite side of the turntable for lowering records onto the track, and mechanism for moving records successively from the top of the series to the turntable, from the turntable to the record lowering means, and along said track from said lowering means to the bottom of the series.

29. In an automatic phonograph, a turntable fixed longitudinally of its center of rotation, a series of disk records supported one upon the other, a stationary support for said series of records, means for continuously placing said records on said turntable, each record being reversed each time it is placed on said turntable.

30. In an automatic phonograph, a turntable fixed longitudinally of its center of rotation, a reservoir in which a plurality of records are adapted to be supported one upon the other, a main operating shaft, means operable by said shaft for sliding records from said reservoir to said turntable, and means operable from said shaft for removing records from said turntable and restoring them to said reservoir, said record being reversed during its travel from the turntable to the reservoir.

31. In a graphophone of the class set forth, the combination of a turntable, a sound reproducer associated therewith, means for rotating the turntable, means for supporting a plurality of records horizontally one upon another in a stack, and mechanism for transferring a record horizontally from one side of the stack onto the turntable and returning it from the turntable to the other side of the stack in reverse position.

32. In a graphophone of the class set forth, the combination of a turntable, a sound reproducer associated therewith, means for rotating the turntable, means for supporting records horizontally in a stack, and mechanism for moving a record from the stack onto the turntable, reversing said record and replacing it in the stack in reverse position.

33. In a graphophone of the class set forth, the combination of a horizontally fixed turntable, a sound reproducer associated therewith, means for rotating the turntable. means for supporting records in a stack, and mechanism operable independently of said turntable for moving a record from the stack onto the turntable and returning it from the turntable to the bottom of the stack.

34. In a graphophone of the class set forth, the combination of a turntable, a sound reproducer associated therewith, means for rotating the turntable, means for supporting records horizontally in a stack, mechanism for moving a record from the top of the stack onto the turntable and returning it from the turntable to the bottom of the stack, and means for temporarily supporting said stack before the record is returned thereto and thereafter releasing said stack to permit it to rest upon the returned record.

35. In a graphophone of the class set forth, the combination of a turntable, a sound reproducer associated therewith, means for rotating the turntable, means for supporting records horizontally in a stack, mechanism for moving a record from the top of the stack onto the turntable and returning it from the turntable to the bottom of the stack, and means for temporarily supporting said stack to permit the returned record to be inserted between the lowermost record thereof and the first-mentioned supporting means.

36. In a graphophone of the class set forth, the combination of a turntable, a sound reproducer associated therewith, means for supporting records one against another in a pack, and mechanism for simultaneously transferring records from the pack to the turntable and back to the pack after having been played.

37. In a graphophone of the class set forth, the combination of a turntable, a sound reproducer associated therewith, means for supporting records horizontally in a stack, and mechanism for moving a record from the stack onto the turntable and returning it underneath the turntable to the stack after having been played.

38. In a graphophone of the class set forth, the combination of a horizontally fixed turntable, a sound reproducer associated therewith, means for supporting records horizontally one upon another in a stack, mechanism operable independently of said turntable for removing a record from the top of the stack onto the turntable and returning it from the turntable to the bottom of the stack, said stack being moved upwardly through the medium of the record returned to the bottom thereof to present the uppermost record in position to be moved onto the turntable.

39. In a graphophone of the class set forth, the combination of a turntable, a sound reproducer associated therewith, means for supporting records horizontally in a stack, mechanism for moving a record from the stack onto the turntable and returning it to the stack beneath the turntable after having been removed therefrom, and means for reversing the record during its return from the turntable to the stack.

40. In a graphophone of the class set forth, the combination of a turntable, a sound reproducer associated therewith, means for supporting records horizontally in a stack, a record reversing means, a carriage reciprocable in the plane of the turntable for shifting the uppermost record of the stack onto the turntable and a played record from the turntable to said reversing means, and connections through which the record reversing means is actuated by the carriage to reverse it and return it to said stack.

41. In a graphophone of the class set forth, the combination of a horizontally fixed turntable, a sound reproducer associated therewith, means for rotating the turntable, means for supporting a plurality of records one against the other in a pack, and mechanism for directing the transfer of a record from one side of the pack to the turntable and from the turntable to the other side of the pack after reproduction, said record having its playing sides reversed during the transfer thereof.

42. In a graphophone of the class set forth, the combination of a horizontally fixed turntable, a sound reproducer associated therewith, means for rotating the turntable, means for supporting a plurality of records one against the other in a pack, mechanism for transferring a record from one side of the pack onto the turntable and from the turntable to the other side of the pack, and means associated therewith for reversing the playing sides of the record during the transfer thereof.

43. In a graphophone of the class set forth, the combination of a horizontally fixed turntable, a sound reproducer associated therewith, means for rotating the turntable, means for supporting a plurality of records one against the other in a pack, mechanism for transferring a record from one side of the pack onto the turntable and returning it from the turntable to the other side of the pack, and means associated therewith for reversing the playing sides of the record during the transfer thereof intermediate said turntable and pack.

44. In a graphophone of the class set forth, the combination of a turntable, a sound reproducer associated therewith, means for rotating the turntable, means for supporting a group of records one against the other, and mechanism for sliding a record from said group to the turntable and from the turntable to the group after reproduction, with its playing sides reversed.

45. In a graphophone of the class set forth, the combination of a horizontally fixed turntable, a sound reproducer associated therewith, means for rotating the turntable, means for supporting a plurality of records one against the other in a pack, and mechanism for directing the transfer of records consecutively from said pack into playing position on the turntable and returning them thereto after reproduction for maintaining a constant number of records in said pack, said mechanism causing the playing sides of said records to be reversed intermediate their transfer from and return to said pack.

46. In a graphophone of the class set forth, the combination of a turntable, a sound reproducer associated therewith, means for supporting records one against the other in a pack, and mechanism for simultaneously transferring records from one side of the pack to the turntable and back to the other side of the pack after having been played.

THOMAS W. SMALL.